US008165032B1

(12) United States Patent
Hanif et al.

(10) Patent No.: US 8,165,032 B1
(45) Date of Patent: Apr. 24, 2012

(54) DYNAMIC CONFIGURATION OF LIVELINESS DETECTION

(75) Inventors: Mohammad Hanif, Pleasanton, CA (US); Lisa Hong Nguyen, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 310 days.

(21) Appl. No.: 12/412,786

(22) Filed: Mar. 27, 2009

(51) Int. Cl.
*H04L 12/26* (2006.01)
(52) U.S. Cl. .................. 370/248; 370/242; 370/252
(58) Field of Classification Search .................. 370/241, 370/242, 248
See application file for complete search history.

(56) References Cited

U.S. PATENT DOCUMENTS

| 2007/0242604 | A1* | 10/2007 | Takase et al. | 370/223 |
|---|---|---|---|---|
| 2008/0304494 | A1* | 12/2008 | Yokoyama | 370/400 |
| 2009/0225652 | A1* | 9/2009 | Vasseur et al. | 370/225 |
| 2010/0149992 | A1* | 6/2010 | Tan | 370/242 |

OTHER PUBLICATIONS

Aggarwal, R. et al., "BFD for MPLS LSPS," Network Working Group, Jun. 20, 2008, Downloaded from http://tools.ietf.org/html/draft-ietf-bfd-mpls-07, 14 pages total.
Pan, P. et al, "Fast Reroute Extensions to RSVP-TE for LSP Tunnels," Network Working Group, May 2005, http://www.ietf.org/rfc/rfc4090.txt?number=4090, 36 pages total.

* cited by examiner

*Primary Examiner* — Hassan Kizou
*Assistant Examiner* — Siming Liu
(74) *Attorney, Agent, or Firm* — Kilpatrick Townsend & Stockton LLP (57) ABSTRACT

Techniques for dynamically establishing and configuring a liveliness detection session for a local repair connection of a connection. In one set of embodiments, a signaling message is received at a node configured to maintain a local repair connection for a connection. A configuration parameter is identified in the signaling message, where the configuration parameter pertains to a liveliness detection mechanism or protocol. A liveliness detection session is then established for the local repair connection based on the configuration parameter.

16 Claims, 4 Drawing Sheets

DYNAMIC CONFIGURATION OF LIVELINESS DETECTION

BACKGROUND OF THE INVENTION

The present application relates to networking, and more particularly relates to techniques for dynamically establishing and configuring a liveliness detection session for a local repair connection of a connection.

Connection-oriented protocols are widely used to transport data across computer networks. In a connection-oriented protocol, a connection is set up between two end points in a network, usually prior to data transmission. For example, nodes or network devices at the end points of a connection may use a preliminary protocol to establish an end-to-end path traversed by the connection before any data is sent. A connection is then signaled using the established path and the connection (with its associated path) is used to transport data between the end points. The first node in the path is referred to as an ingress node and the last node in the path is referred to as an egress node. Examples of connection-oriented protocols include circuit switching protocols such as Asynchronous Transfer Mode (ATM) protocol, Frame Relay, Multi-Protocol Label Switching (MPLS), and others.

Multi-Protocol Label Switching (MPLS) is a connection-oriented mechanism that emulates some properties of a circuit-switched network over a packet-switched network. It was designed to provide a unified data-carrying service for both circuit-based clients and packet-switching clients that provide a datagram service model. It can be used to carry many different kinds of traffic, including IP packets, as well as native ATM, SONET, and Ethernet frames. In MPLS, a connection between two end points is referred to as a Label Switched Path (LSP). Various signaling protocols such as Label Distribution Protocol (LDP), Resource Reservation Protocol-Traffic Engine (RSVP-TE), Constraint-based Routed LDP (CR-LDP), and others may be used to set up an LSP. Nodes in an LSP are typically routers, and are referred to as Label Switching Routers (LSRs). The first router in an LSP is referred to as an ingress router and the last router in an LSP is referred to as an egress router. Routers in between the ingress router and the egress router are referred to as transit LSRs. LSPs are unidirectional and enable a packet to be label switched through the MPLS network from one end point to another.

In some instances, a connection (such as an LSP in an MPLS network) may experience data transmission disruptions due to failures of one or more facilities (e.g., nodes or links) in the path traversed by the connection. To safeguard against such disruptions, one or more alternate connections may be determined for the original connection that enable failed facilities along the path of the original connection to be bypassed. These alternate connections are referred to as local repair connections. Each local repair connection is associated with a path (referred to as a backup path) that originates at a first node in the path associated with the original connection and ends at a second node in the path associated with the original connection, where the second node is downstream from the first node. The first node is referred as a Point of Local Repair (PLR) and the second node is referred to as a merge point (MP). A connection (and its associated path) is said to be protected if at least one local repair connection has been established for that connection. A facility in a connection is said to be protected if at least one local repair connection has been configured that does not use that facility.

Different connection-oriented protocols may use different techniques to set up and maintain local repair connections. For example, in the case of MPLS, a technique known as Fast Reroute (FRR) may be used to dynamically set up local repair connections (referred to as backup LSPs) for LSP tunnels. In FRR, one or more backup LSPs are dynamically established for a primary LSP prior to the detection of any failures along the path traversed by the primary LSP. This a priori establishment allows the PLRs (i.e., the ingress nodes of the backup LSPs) to quickly redirect traffic through its corresponding backup path if a failure in the primary path is detected.

In addition to local repair techniques, connection-oriented protocols may also implement techniques for detecting the liveliness of a connection. Generally speaking, a connection is considered alive if there are no data plane failures (i.e., failures that prevent the transmission of data messages) along the path traversed by the connection. One mechanism that is widely used to detect the liveliness of a connection (such as an MPLS LSP) is Bidirectional Forwarding Detection (BFD). In BFD, a BFD session is manually established for a given connection at one or more end points (e.g., the ingress node and egress node) of the connection. "Hello" packets are then transmitted by the ingress node and/or the egress node. If a number of hello packets transmitted by an ingress or egress node are not received at the other node, the BFD session (and its associated connection) is considered dead.

One limitation with current methods for deploying local repair (via, e.g., FRR) and liveliness detection (via, e.g., BFD) in an MPLS network is that there is no way to dynamically establish and configure a liveliness detection session for the backup LSPs of a protected LSP. For example, although a signaling protocol such as RSVP-TE may be used to dynamically establish a backup LSP at a transit LSR of a primary LSP, there is no mechanism in RSVP-TE (or any other signaling protocol) to dynamically establish a BFD session for that backup LSP at that transit LSR.

Accordingly, techniques are desired for dynamically establishing and configuring a liveliness detection session, such as BFD, for a local repair connection of a protected connection, such as for a backup LSP of a protected LSP.

BRIEF SUMMARY OF THE INVENTION

Embodiments of the present invention provide techniques for dynamically establishing and configuring a liveliness detection session for a local repair connection of a connection. In one set of embodiments, a signaling message is received at a node configured to maintain a local repair connection for a connection. A configuration parameter is identified in the signaling message, where the configuration parameter pertains to a liveliness detection mechanism or protocol. A liveliness detection session is then established for the local repair connection based on the configuration parameter.

According to one set of embodiments, a configuration parameter in a signaling message is identified at a network device. A session for determining liveliness of an alternate connection of a connection is then established at the network device based on the configuration parameter.

In one embodiment, the connection comprises a path traversing a plurality of nodes from a first node to a second node, and the signaling message originates from the first node.

In one embodiment, the alternate connection originates at a first node in a path of the connection and ends at a second node in the path. Further, the network device is the first node.

In one embodiment, the signaling message is forwarded to a third node in the path, where the third node is configured to establish a session for determining liveness of another alternate connection of the connection based on the configuration parameter.

In one embodiment, the signaling message is forwarded to a third node in the path, where the third node is configured to ignore the configuration parameter.

In one embodiment, the configuration parameter is a minimum time interval for transmitting liveness control packets, a minimum time interval for receiving liveness control packets, or a number of consecutive control packets that should be identified as missing before determining that a path is dead.

In one embodiment, a determination is made that another signaling message does not include any configuration parameters pertaining to liveness detection, and the liveness detection session is removed in response to the determination.

In one embodiment, the alternate connection is not in use as a failover for the connection at a time of establishing the session.

In one embodiment, the session is a Bidirectional Forwarding Detection (BFD) session.

In one embodiment, the connection is a protected Label Switched Path (LSP) in a Multi-Protocol Label Switching (MPLS) network and the alternate connection is a backup LSP of the protected LSP.

In one embodiment, the protected LSP is protected via Fast Reroute (FRR).

In one embodiment, the signaling message is an Resource Reservation Protocol-Traffic Engine (RSVP-TE) message.

According to another set of embodiments, a signaling message is generated at a network device, where the signaling message includes a configuration parameter pertaining to liveness detection. The signaling message is then forwarded to another network device.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. It will be apparent, however, that the invention may be practiced without these specific details.

Figure 1:
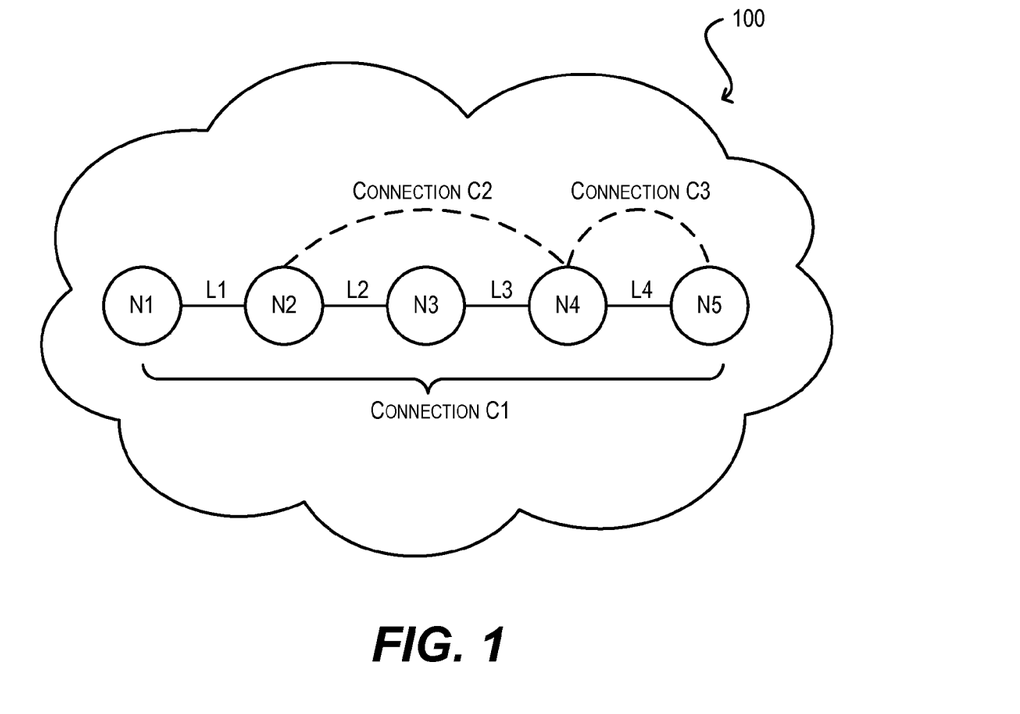
FIG. 1 is a simplified block diagram illustrating a network that may incorporate an embodiment of the present invention.

FIG. 1 is a simplified diagram of a network 100 that may incorporate an embodiment of the present invention. As shown, network 100 comprises a plurality of nodes (N1, N2, N3, N4, N5) and a plurality of links (L1, L2, L3, L4) connecting the nodes. Although five nodes and four links are depicted, one of ordinary skill in the art will appreciate that network 100 may support any number of nodes and links.

A node may be any device that is capable of forwarding data, such as a switch, a router, etc. A link may be any transport medium that is capable of communicatively coupling two or more nodes, such as a physical wire, a wireless link, etc. Links may have different capacities such as 10/100 megabits-per-second (Mbps), 1 gigabit-per-second (Gbps), 10 Gbps, and so on. The links may be unidirectional or bidirectional.

In various embodiments, network 100 may be capable of transmitting data using a connection-oriented protocol, a connectionless protocol, or other types of protocols. In the embodiment illustrated in FIG. 1, network 100 employs a connection-oriented protocol and comprises a connection C1 for communicating data between node N1 and node N5. Connection C1 is associated with a path (N1-L1-N2-L2-N3-L3-N4-L4-N5) traversing the nodes and links between N1 and N5. Node N1 is the ingress node for the path and node N5 is the egress node for the path. In one set of embodiments, connection C1 may be set up prior to the transmission of data between N1 and N5.

Various different connection-oriented mechanisms (e.g., Asynchronous Transfer Mode (ATM) protocol, Frame Relay, Multi-Protocol Label Switching (MPLS), etc.) may be used to transmit data across connection C1. In one set of embodiments, MPLS may be used to transmit data across the connection. In these embodiments, nodes N1, N2, N3, N4, N5 are routers and connection C1 corresponds to a Label Switched Path (LSP). The LSP carries data traffic from ingress router N1 to egress router N5 via a path traversing link L1, transit Label Switching Router (LSR) N2, link L2, transit LSR N3, link L3, transit LSR N4, and link L4.

To safeguard against disruptions caused by the failure of one or more facilities (e.g., nodes or links) along the path of connection C1, one or more local repair connections may be established for the connection. Such local repair connections enable traffic to be rerouted around a failed facility, thereby ensuring that traffic continues to flow uninterrupted via the connection. As shown in FIG. 1, two local repair connections C2 and C3 are established for connection C1. A connection (and its associated path) is said to be protected if at least one local repair connection has been established for that connection. Thus, connection C1 may be considered a protected connection and its associated path (N1-L1-N2-L2-N3-L3-N4-L4-N5) may be considered a protected path.

Local repair connections C2 and C3 are each associated with a path (referred to as a backup path) that originates at a first node in the protected path of the C1 and ends at a second node in the protected path of C1 downstream from the first node. The first node (i.e., the ingress node for the backup path) is referred to a Point of Local Repair (PLR) and the second node (i.e., the egress node for the backup path) is referred to as a Merge Point (MP). For example, local repair connection C2 is associated with a backup path that originates at node N2 in the protected path of C1 and ends at node N4 in the protected path of C1. Accordingly, node N2 is a PLR and node N4 is an MP for local repair connection C2. Similarly, local repair connection C3 is associated with a backup path that originates at node N4 in the protected path of C1 and ends at node N5 in the protected path of C1. Accordingly, node N4 is a PLR and node N5 is an MP for local repair connection C3. Although not shown in FIG. 1, the backup paths of C2 and C3 may each comprise zero or more nodes which may be distinct from the nodes in the protected path of C1.

In the event of a failure at a facility along the protected path of C1, PLR nodes N2 and N4 may be configured to reroute traffic onto their corresponding backup paths and thus bypass the failure. For example, in the event of a failure at node N3, PLR node N2 may reroute traffic onto the backup path of local repair connection C2. The traffic would then merge back onto the protected path of C1 at MP node N4. In the event of a failure at link L4, PLR node N4 may reroute traffic onto the backup path of local repair connection C3. The traffic would then merge back onto the protected path of C1 at MP node N5. Note that, in the example of FIG. 1, there are no local repair connections that provide protection against a failure at L1, N2, L3, or N4. However, one of ordinary skill in the art will appreciate that additional local repair connections may be established as necessary so that some or all of the facilities in the protected path of C1 are protected.

In one set of embodiments, a technique known as Fast Reroute (FRR) may be used to establish local repair connections C2 and C3. FRR (which applies to MPLS networks) employs extensions to the RSVP-TE signaling protocol to dynamically establish local repair connections (e.g., backup LSPs) for a protected connection (e.g., a protected LSP) prior to the detection of any failures in the path traversed by the protected connection. FRR is typically used in applications where data has to be forwarded within specified time limits (e.g., voice over IP applications). Since FRR establishes backup LSPs for a protected LSP in advance, the traffic forwarded via the protected LSP can be redirected, if needed, onto a backup LSP without having to spend time creating the backup LSP after the occurrence of a network failure.

In addition to the local repair techniques described above, network 100 may implement a liveliness detection mechanism, such Bidirectional Forwarding Detection (BFD), to determine the liveliness of one or more connections. As used herein, a liveliness detection mechanism is a mechanism for detecting the presence of data plane failures (i.e., failures that prevent the transmission of data messages) in the path traversed by a connection. An example of a data plane failure is a failure at a facility along the path of the connection that prevents data messages from being forwarded through that facility. In one set of embodiments, the detection of the presence of a data plane failure may comprise determining whether a predetermined number of liveliness detection control packets are (or are not) received at an end point of a connection within a specified period of time. If the predetermined number of control packets are received, the connection is considered alive; conversely, if the predetermined number of control packets are not received, a data plane failure in the path of the connection is inferred and the connection is considered dead.

Generally speaking, liveliness detection mechanisms such as BFD are manually established and configured for a connection at the ingress and/or egress node of the path associated with the connection for which liveliness detection is to be performed. For example, with respect to FIG. 1, a BFD session may be manually established and configured for protected connection C1 at ingress node N1. In this manner, the liveliness of protected connection C1 may be monitored. However, there is no mechanism in the prior art for dynamically establishing/configuring liveliness detection for the local repair connections of a protected connection. For example, there is no existing mechanism for dynamically signaling BFD sessions for local repair connections C2 and C3 of protected connection C1. As discussed in detail below, embodiments of the present invention provide techniques that overcome this and other similar limitations.

Figure 2:
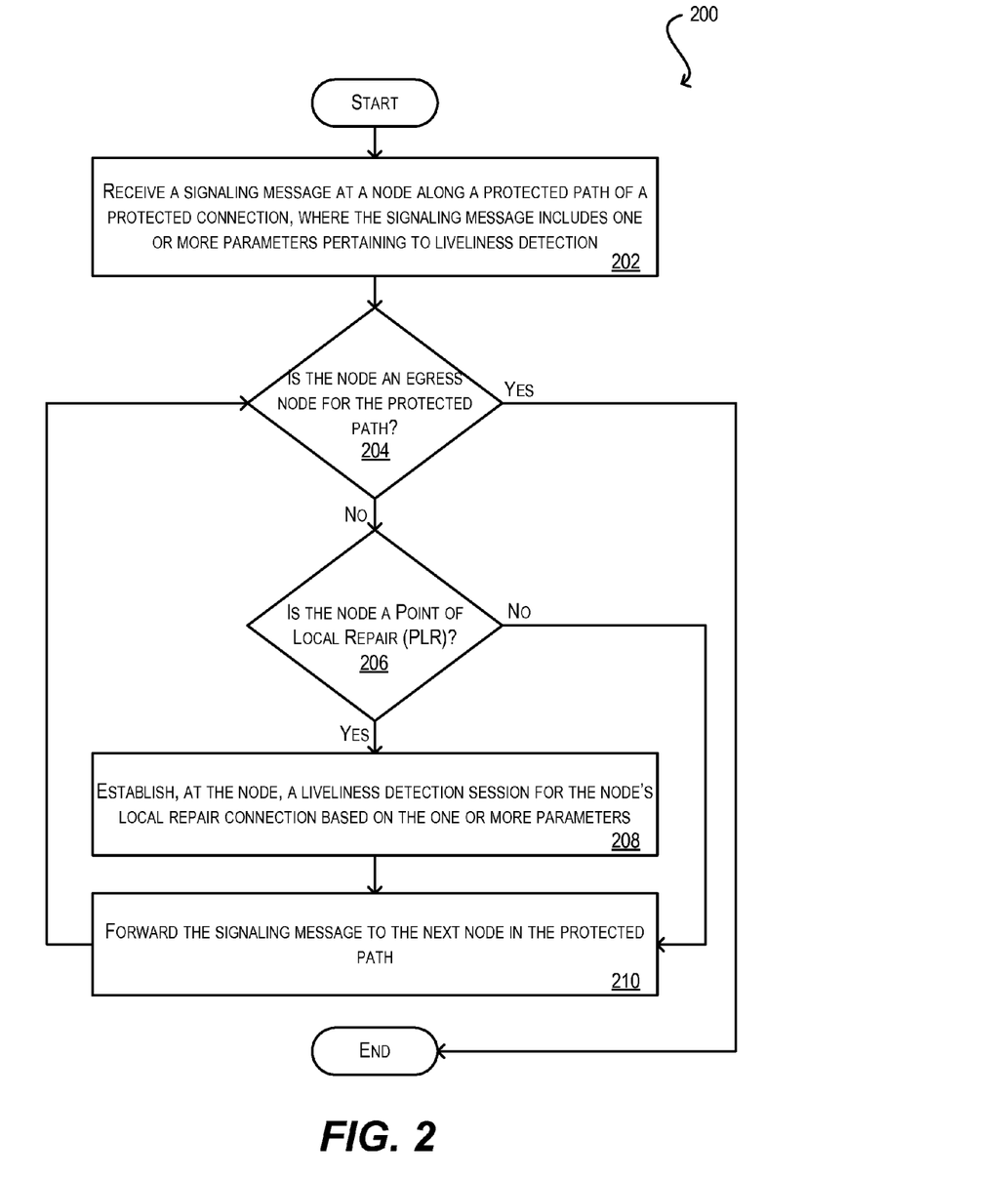
FIG. 2 is a flowchart illustrating steps performed in dynamically establishing/configuring a liveness detection session for a local repair connection in accordance with an embodiment of the present invention.

FIG. 2 is a flowchart 200 illustrating steps performed in dynamically configuring a liveliness detection session for a local repair connection in accordance with an embodiment of the present invention. The processing depicted in FIG. 2 may be performed by software modules (e.g., code or instructions executed by a control module), hardware modules, or combinations thereof. The software modules may be stored on a computer-readable storage medium. In one embodiment, the processing is performed by a node in the protected path of a protected connection, such as node N1, N2, N3, N4, or N5 of FIG. 1.

At step 202, a signaling message is received at a node in the protected path of a protected connection. In one set of embodiments, the signaling message is a message that is expressed according to a signaling protocol, such as RSVP-TE. For example, the signaling message may be an RSVP-TE PATH message. However, unlike a typical RSVP-TE PATH message, the signaling message received at step 202 includes a novel data section (referred to as an object) comprising one or more parameters pertaining to liveliness detection. For example, the signaling message may include an object comprising one or more parameters for configuring a BFD session. An embodiment of such an object is discussed in greater detail with respect to FIG. 3 below.

In one set of embodiments, the signaling message originates at another node upstream of the receiving node of step 202 in the protected path. For example, the signaling message may be generated by the ingress node of the protected path to dynamically configure liveliness detection at one or more of the downstream nodes in the protected path (transit LSRs). In alternative embodiments, the signaling message may originate from a source outside of the protected path.

If the node that receives the signaling message at step 202 is the egress node for the protected path, the processing of flowchart 200 ends (step 204). However, if the receiving node is not the egress node, a determination is made whether the receiving node is a PLR (i.e., a node that has established and maintains a local repair connection for the protected connection) (step 206). Each ingress and transit LSR in the protected connection may establish a local repair connection and thereby can assume a role of a PLR.

If the receiving node is not a PLR, the one or more parameters pertaining to liveliness detection are ignored by the node. However, if the receiving node is a PLR, the node processes the one or more parameters and establishes a liveliness detection session for the node's local repair connection based on the parameters in the signaling message (step 208). For example, if the node is a PLR in a protected LSP and if the one or more parameters pertain to BFD, the node would establish a BFD session for the backup LSP maintained by the node based on the BFD parameters. In this manner, liveliness detection for the backup LSP can be established dynamically (e.g., through a signaling message), without requiring manual establishment at the PLR node (or without even having to know which nodes in a protected path are PLR nodes).

Note that a liveliness detection session may already be established at the PLR node if the PLR node previously received a signaling message comprising liveliness detection parameters. In this situation, the parameters in the current signaling message would be used to configure the already-established session.

Applying steps 202-208 of flowchart 200 to FIG. 1, a signaling message may be generated at ingress node N1 of protected connection C1 and received at node N2. Since N2 is a PLR and maintains local repair connection C2, N2 establishes a liveliness detection session for C2 per the parameters in the message. In one embodiment, the liveliness detection session may be established between nodes N2 and N4, which are the end points of local repair connection C2. Accordingly, liveliness detection control packets may be transmitted between nodes N1 and N4, thereby allowing the liveliness of local repair connection C2 to be monitored. In other embodiments, the liveliness detection session may be established between nodes N1 and N5 (the egress node of the protected connection). In these embodiments, liveliness detection control packets may be transmitted between nodes N2 and N5.

In some cases, a PLR node may maintain local repair connections for different protected connections. In these embodiments, the processing of step 208 may establish a separate BFD session for each local repair connection maintained by the PLR node.

In one set of embodiments, the processing of step 208 may be performed by a PLR node before the occurrence of a failure that requires redirection of traffic onto the node's local repair connection. In other words, the processing of step 208 may be performed before the local repair connection is actually used as a failover path for the protected connection. Thus, the liveliness of a local repair connection may be monitored (via the liveliness detection session) even while the local repair connection is inactive.

At step 210, the signaling message is forwarded to the next node downstream of the receiving node in the protected path. The processing then returns to step 204. For example, if the next node is the egress node for the protected path, the processing ends. Alternatively, if the next node is neither the egress node nor a PLR, the next node ignores the parameters included in the signaling message and forwards the message to the subsequent downstream node. Alternatively, if the next node is not the egress node but is another PLR, the next node configures a liveliness detection session for its local repair connection per step 208 and forwards the message to the subsequent downstream node.

For example, returning to FIG. 1, the signaling message received at node N2 may be forwarded to node N3. Since N3 is not acting as a PLR, N3 ignores the parameters and forwards the message to N4. Since N4 is a PLR and maintains local repair connection C3, N4 configures a liveliness detection session for C3 per the parameters in the message and forwards the message to N5. Finally, since N5 is the egress node for C1, the processing ends.

Although not shown in flowchart 200, once a PLR node has received and processed a signaling message comprising liveliness detection parameters per steps 202 and 208, the PLR node may receive subsequent signaling messages comprising modified values for the parameters. In these cases, the PLR node may configure/reconfigure the liveliness detection session in accordance with the modified values. If a subsequent signaling message does not include any liveliness detection parameters, the PLR node may remove the session.

Figure 3:
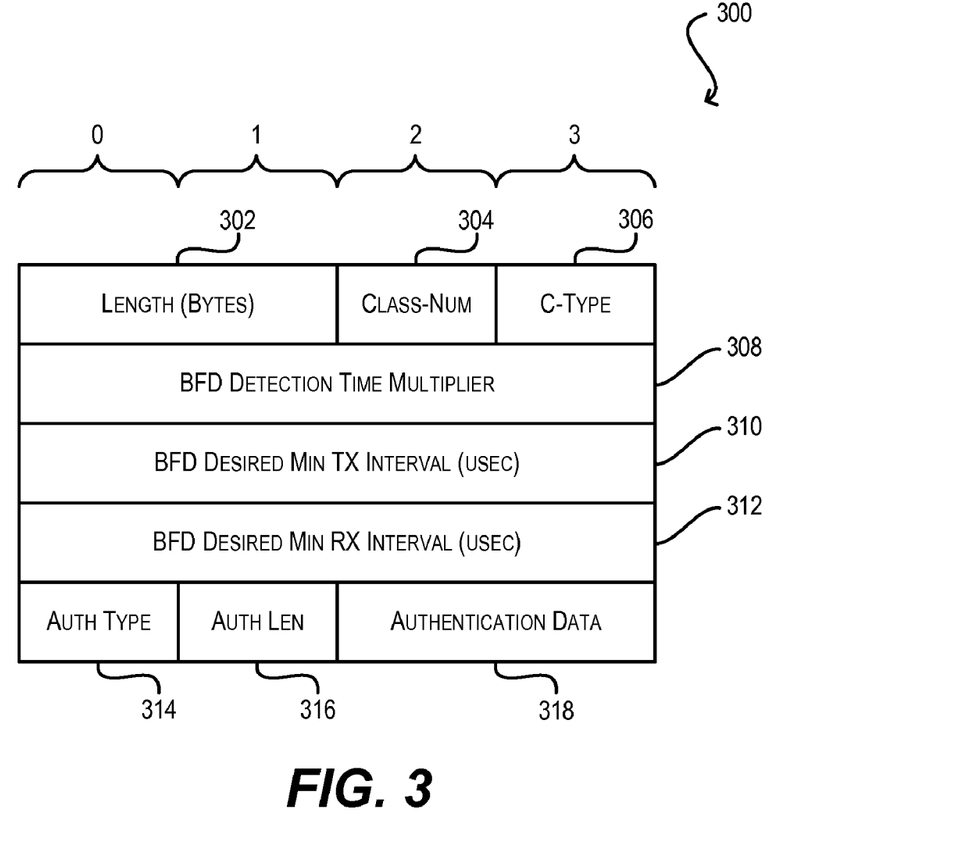
FIG. 3 is a simplified block diagram illustrating an object for supporting establishment/configuration of a liveness detection session in accordance with an embodiment of the present invention.

FIG. 3 is a simplified block diagram illustrating an object 300 comprising one or more parameters for configuring a liveliness detection session in accordance with an embodiment of the present invention. In a particular embodiment, object 300 is a novel RSVP extension object comprising parameters for configuring a BFD session. As discussed with respect to FIG. 2, object 300 may be included in a signaling message (e.g., an RSVP-TE PATH message) for facilitating the establishment/configuration of a liveliness detection session (e.g., BFD session) at the PLR nodes of a protected connection (e.g., a protected LSP).

In the embodiment illustrated in FIG. 3, object 300 includes a number of parameters that are specific to the RSVP-TE protocol: Length 302, Class-Num 304, and C-Type 306. Length 302 defines the total object length in bytes. Class-Num 304 defines the RSVP class of object 300. The value for Class-Num 304 is typically assigned by the Internet Assigned Numbers Authority (IRNA). C-Type 306 defines the RSVP type of object 300 and, together with Class-Num 304, is used to distinguish object 300 from other existing RSVP objects.

Object 300 further includes a number of parameters that may be used by a PLR to configure a BFD session for a local repair connection. For example, BFD Detection Time Multiplier 308 defines a number of consecutive BFD control packets (e.g., "Hello" packets) that may be missed by the PLR before declaring that the local repair connection is dead. BFD Desired Min TX Interval 310 defines a minimum time interval (in microseconds) supported by the PLR for transmitting BFD control packets along the local repair connection. And BFD Desired Min RX Interval 312 defines a minimum time interval (in microseconds) supported by the PLR for receiving BFD control packets from the local repair connection.

In some embodiments, object 300 may also include an optional authentication section comprising an Auth Type parameter 314, Auth Len parameter 316, and Authentication Data parameter 318. These parameters may be used to enable authentication on a BFD session.

Although parameters 302-318 are depicted in FIG. 3 as being organized according to a particular format, it should be appreciated that the parameters may be organized differently in alternative embodiments. Further, one or more of parameters 302-318 may be removed from object 300 (and/or one or more additional parameters may be added) based on the context in which object 300 is used. For example, while RSVP-specific parameters 302-308 may be necessary if object 300 is included in an RSVP-TE signaling message, these parameters may be removed if object 300 is incorporated into a different type of signaling message. One or more additional parameters may also be included in alternative embodiments. One of ordinary skill in the art will recognize many variations, modifications, and alternatives.

Figure 4:
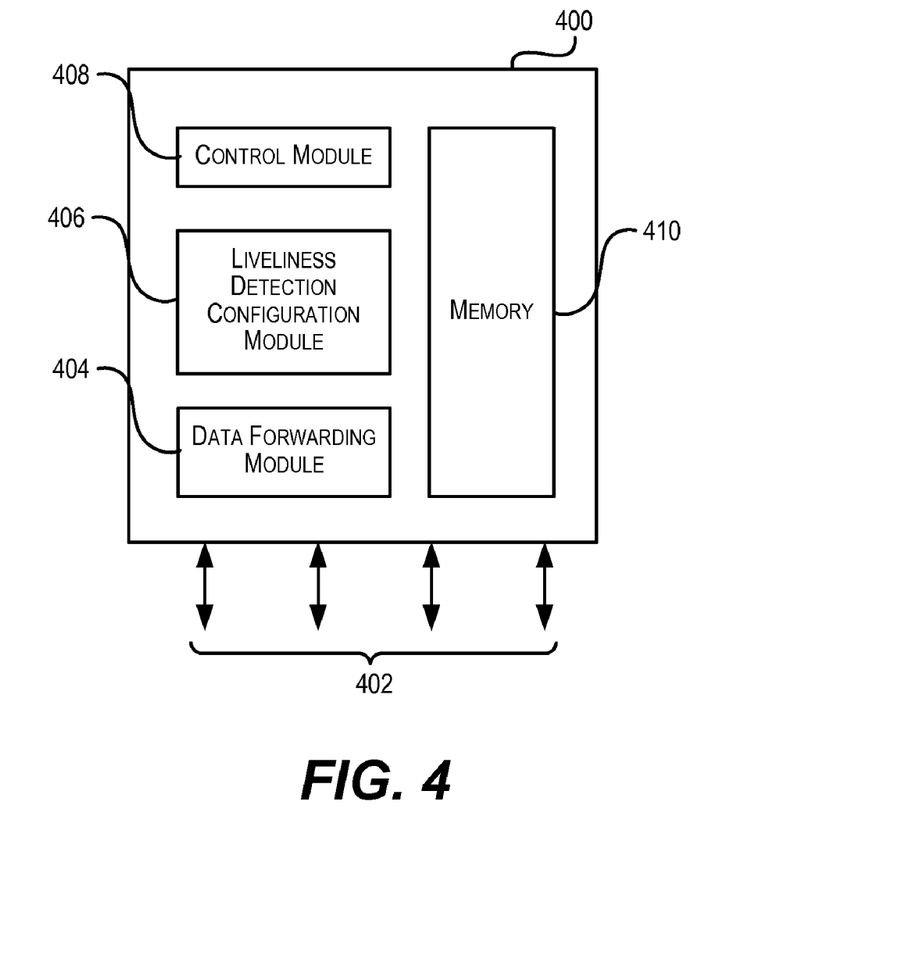
FIG. 4 is a simplified block diagram illustrating a network device in accordance with an embodiment of the present invention.

FIG. 4 is a simplified block diagram illustrating a network device in accordance with an embodiment of the present invention. Device 400 may correspond to one or more of the nodes depicted in network 100 of FIG. 1. In one set of embodiments, device 400 may be a switch or router, such as the switches or routers provided by Brocade Communications®, Inc. of San Jose, Calif.

As shown in FIG. 4, device 400 comprises a plurality of physical ports 402, a data forwarding module 404, a liveliness detection configuration module 406, a control module 408, and a memory 410. The modules may be implemented in software, hardware, or combinations thereof. Device 400 illustrates a device incorporating a particular embodiment of the present invention and is not intended to limit the scope of the present invention. The structure of device 400 may be different in other embodiments of the present invention.

Device 400 receives data packets via one or more ports 402. The received data may then be forwarded from device 400 to other links or nodes in a network (e.g., network 100 of FIG. 1) via ports 402. Data forwarding module 404 is configured to perform processing to facilitate the forwarding of data packets received by device 400. As part of the processing, data forwarding module 404 may be configured to process a data packet received by device 400, determine a destination port of device 400 to which the packet is to be forwarded, and forward the packet to the determined destination port. Data forwarding module 404 may use information stored in memory 410 for data forwarding.

Data forwarding module 404 may comprise hardware, software components, or combinations thereof. In one embodiment, data forwarding module 404 comprises one or more line cards and a switching fabric. The line cards and switching fabric are used to forward data packets from an input port of device 400 to an output port of device 400. The hardware components may include ASICs, field programmable logic devices such as FPGAs, circuitry, and the like. The software components may include programs comprising code or instructions that are executed by control module 408 or by a control module within data forwarding module 404. The software components may be stored on a machine-readable storage medium.

Data forwarding module 404 may also be configured to reroute data traffic for a protected connection along a local repair connection to protect a link and/or node of the protected connection. Information related to protected connections and their local repair connections and associated backup paths may be stored in memory 410 and used by data forwarding module 404.

Liveliness detection configuration module 406 is configured to perform processing related to establishing/configuring a liveliness detection session for a local repair connection maintained by the device. For example, liveliness detection configuration module 406 may be configured to perform one or more of the processing steps described with respect to FIG. 2 above. Information that is used by liveliness detection configuration module 406 may be stored in memory 410. Once a liveliness detection session has been established for a local repair connection, liveliness detection configuration module 406 may also be configured to monitor the session to determine liveliness of the local repair connection.

Liveliness detection configuration module 406 may comprise hardware components, software components, or combinations thereof. The hardware components may include ASICs, FPGAs, circuitry, and the like. The software components may include code or instructions that are executed by control module 408 or by control module within module 406.

Control module 408 may execute software programs comprising code and instructions to perform various tasks. Control module 408 may also aid modules 404 and 406 in carrying out functions performed by those modules. For example, control module 408 may be configured to perform functions such as data forwarding, parsing a received signaling message, establishing/configuring a liveliness detection session, and the like. In one embodiment, control module 408 is a general-purpose processor. In other embodiments, control module 408 is a dedicated processing component configured to carry out specific tasks on behalf of device 400.

Memory 410 acts as a repository for storing data that is used by device 400. For example, memory 410 may store information related to various protected connections and local repair connections. Memory 410 may also store data pertaining to a liveliness detection session for a connection. For example, memory 410 may store one or more parameters pertaining to the session.

Memory 410 may also store programs comprising software code or instructions that are executed by control module 408 and/or by the other modules of device 400. For example, code or instructions that cause control module 408 (or modules 404 or 406) to configure a liveliness detection session for a local repair connection, as described above, may be stored in memory 410.

Processing according to the teachings of the present invention may be performed by a device, a system, or an apparatus in a networked or non-networked environment (i.e., standalone embodiment). Although specific embodiments have been described in the context of dynamically configuring BFD for backup LSPs of a protected LSP, it will be apparent that the invention is not limited to such contexts. The scope of the present invention as recited in the claims may be applied to dynamically establish and/or configure any type of liveliness detection session for any type of local repair connection. Further, although specific embodiments have been described with respect to the RSVP-TE signaling protocol, other types of protocols may also be supported.

Further, although the present invention has been described using a particular series of transactions and steps, it should be apparent to those skilled in the art that the scope of the present invention is not limited to the described series of transactions and steps.

Further, although the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will be evident that additions, subtractions, deletions, and other modifications and changes may be made thereunto without departing from the broader spirit and scope of the invention as set forth in the claims.

What is claimed is:

1. A method comprising:
   identifying, at a network device, a configuration parameter in a signaling message;
   determining, at the network device, whether the network device is a point of local repair;
   if the network device is a point of local repair:
      establish, at the network device, a session for determining a liveliness of an alternative connection of a connection based on the configuration parameter; and
      forwarding, at the network device, the signaling message to another network device; and
   if the network device is not a point of local repair:
      forwarding, at the network device, the signaling message to another network device without establishing the session.

2. The method of claim 1 wherein the connection comprises a path traversing a plurality of nodes from a first node to a second node, and wherein the signaling message originates from the first node.

3. The method of claim 1 wherein the alternate connection originates at a first node in a path of the connection and ends at a second node in the path, and wherein the network device is the first node.

4. The method of claim 3 wherein forwarding the signaling message to the another network device comprises forwarding the signaling to a third not in the path, wherein the third node is configured to establish a session for determining liveliness of another alternate connection of the connection based on the configuration parameter.

5. The method of claim 3 wherein forwarding the signaling message to the another network device comprises forwarding the signaling message to a third node in the path, wherein the third node is configured to ignore the configuration parameter.

6. The method of claim 1 wherein the configuration parameter is a minimum time interval for transmitting liveliness control packets, a minimum time interval for receiving liveliness control packets, or a number of consecutive control packets that should be identified as missing before determining that a path is dead.

7. The method of claim 1 wherein the alternate connection is not in use as a failover for the connection at a time of establishing the session.

8. The method of claim 1 wherein the session is a Bidirectional Forwarding Detection (BFD) session.

9. The method of claim 1 wherein the connection is a protected Label Switched Path (LSP) in a Multi-Protocol Label Switching (MPLS) network, and wherein the alternate connection is a backup LSP of the protected LSP.

10. The method of claim 9 wherein the protected LSP is protected via Fast Reroute (FRR).

11. The method of claim 1 wherein the signaling message is an Resource Reservation Protocol-Traffic Engine (RSVP-TE) message.

12. A system comprising:
a memory configured to store information pertaining to an alternate connection of a connection; and
a control module configured to:
identify a configuration parameter in a signaling message;
determine whether the system is a point of local repair;
if the system is a point of local repair:
establish a session for detecting liveliness of the alternate connection based on the configuration parameter; and
forwarding the signaling message to another system; and
if the system is not a point of local repair:
forward the signaling message to another system without establishing the session.

13. The system of claim 12 wherein the connection comprises a path traversing a plurality of nodes from a first node to a second node, and wherein the signaling message originates from the first node.

14. The system of claim 12 wherein the alternate connection originates at a first node in a path of the connection and ends at a second node in the path, and wherein the system is the first node.

15. The system of claim 14 wherein forwarding the signaling message to the another system comprises forwarding the signaling message to a third node in the path, and wherein the third node is configured to establish a session for detecting liveliness of another alternate connection of the connection based on the configuration parameter.

16. A non-transitory computer-readable medium storing program code executable by a network device, the program code comprising:
code for identifying a configuration parameter in a signaling message;
code for determining whether the network device is a point of local repair;
If the network device is a point of local repair:
code for establishing a session for determining liveliness of an alternate connection of a connection based on the configuration parameter; and
code for forwarding the signaling message to another network device; and
if the network device is not a point of local repair:
code for forwarding the signaling message to another network device without establishing the session.

* * * * *